United States Patent [19]

Shaw

[11] 4,066,874

[45] Jan. 3, 1978

[54] DIGITAL SPEED CONTROL SYSTEM

[75] Inventor: Mark Layne Shaw, Mesa, Ariz.

[73] Assignee: Motorola, Inc., Schaumburg, Ill.

[21] Appl. No.: 703,479

[22] Filed: July 8, 1976

[51] Int. Cl.$^2$ .................. G06M 3/08; F22B 11/00

[52] U.S. Cl. .................. 235/92 CM; 235/92 FQ; 235/92 AE; 235/92 R; 123/102; 180/105 E

[58] Field of Search ........ 235/92 CM, 92 FQ, 92 AE, 235/92 PL, 92 CC, 92 TC; 123/97 R, 102; 324/160, 162; 73/507, 506, 489, 511; 180/105 E

[56] References Cited

U.S. PATENT DOCUMENTS

| | | | |
|---|---|---|---|
| 3,885,137 | 5/1975 | Ooya et al. | 123/102 |
| 3,891,046 | 6/1975 | Oicles | 180/105 E |

*Primary Examiner*—Joseph M. Thesz
*Attorney, Agent, or Firm*—Joe E. Barbee

[57] ABSTRACT

A digital speed control system includes a first binary up-counter called an Actual Count Register. The Actual Count Register is initially reset to contain all "0"s. During a sample time, an input is applied to the Actual Count Register so that it counts up to a first binary number during the sample time. The first binary number represents a reference speed. The system includes a Reference Count Register. In response to read and store command, the first binary number is loaded into the Reference Count Register, where it remains until the next request for a new reference speed. The system further includes a first binary presettable up-counter called the Error Register. The Error Register counts up at the same rate and in response to the same count signal as the Actual Count Register. During a Transfer signal which follows the Read signal, the complement of the first binary number is transferred from the Reference Count Register into the Error Register. The system also includes a second binary presettable up-counter called an Acceleration Register. The inputs of the Acceleration Register are coupled to the outputs of the Actual Count Register so that during the transfer signal the complement of the first binary number is loaded into the Acceleration Register. A decoder connected to the outputs of the Error Register interprets its contents, and a second decoder interprets the contents of the the Acceleration Register.

5 Claims, 9 Drawing Figures

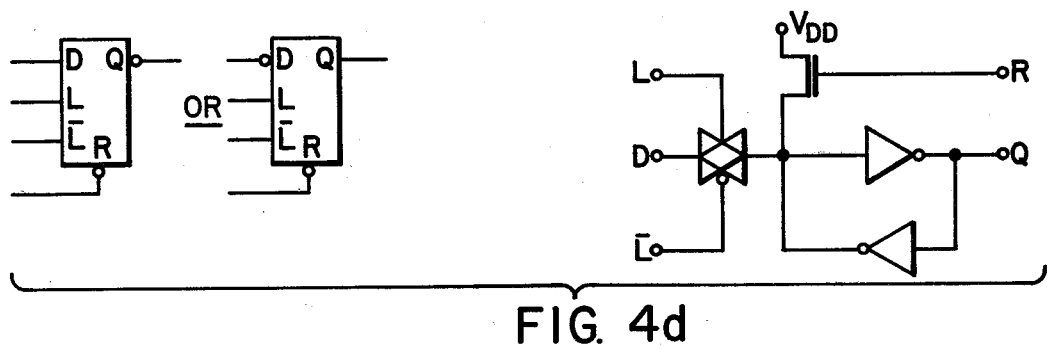
FIG. 4d
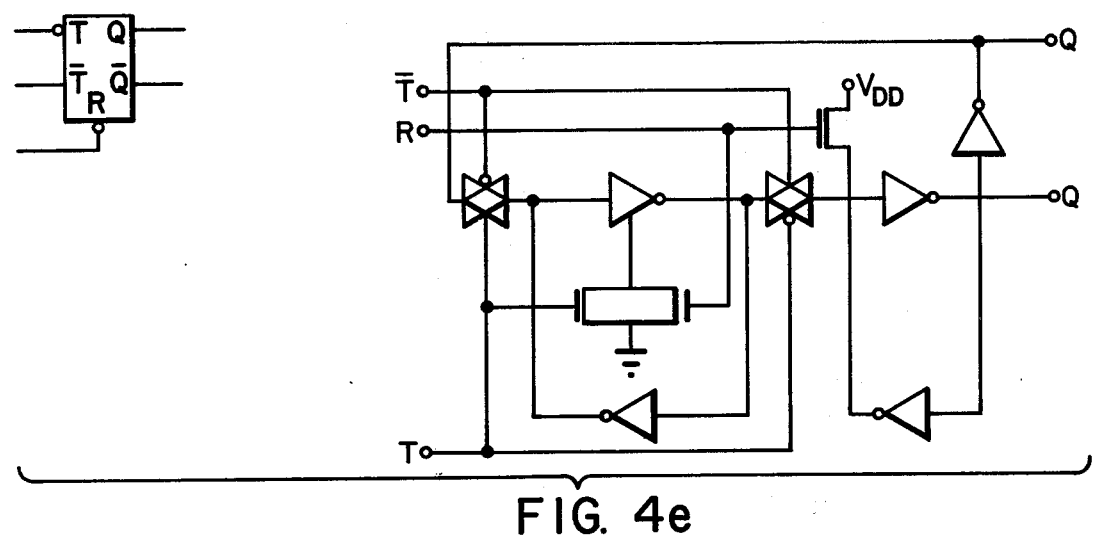
FIG. 4e
FIG. 5
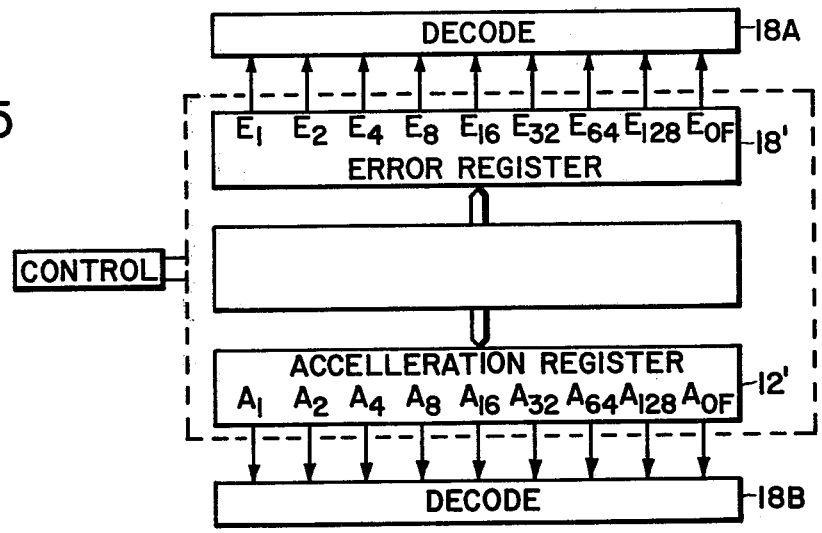

DIGITAL SPEED CONTROL SYSTEM

BACKGROUND OF THE INVENTION

A number of digital cruise control systems have been implemented in the automotive industry. One general type of system includes a control activated by the driver by means of which the driver first accelerates up to the desired cruise speed and then enters that speed which he has attained by activating the control. This system stores that speed as a reference, and maintains the auto at that speed, the cruise speed, by detecting deviations from the cruise speed and correspondingly accelerating or decelerating the automobile. In some systems, if the brake is activated, the accelerator mechanism is released from control of the cruise control system, but the reference cruise speed is still stored. After the braking operation is over, the driver may activate the cruise control system to cause the automobile to accelerate back up to the reference cruise speed. Such cruise control systems have utilized complex circuitry and have been quite costly. Simpler, more reliable, less complex and less costly cruise control, velocity control and acceleration control systems are needed.

SUMMARY OF THE INVENTION

Briefly described, the invention is a logic circuit in a velocity control system. The logic circuit includes a counting signal circuit for generating a first counting signal representative of a first velocity and a second counting signal representative of a second velocity. The logic circuit includes a first binary counter coupled to the counting signal circuit for counting from an initial value to a first binary number representative of the first velocity in response to the first counting signal. The first binary counter also counts from the initial value to a second binary number representative of a second velocity. The logic circuit also includes a second binary counter coupled to the counting signal circuit and to the first binary counter for receiving and storing the logical complement of the first binary number and for counting from the complement to a third binary number. The system also includes decoding circuitry coupled to the second binary counter for interpreting the contents of the second binary counter to determine the algebraic difference between the first and second binary numbers.

BRIEF DESCRIPTION OF THE DRAWINGS

FIGS. 4a–4e are schematic diagrams illustrating the circuitry utilized in the block of FIG. 3.

FIG. 5 is a block diagram illustrating the combination of the circuit of FIG. 1 with decoders for interpreting the outputs of the Error Register and Acceleration Register.

DESCRIPTION OF THE INVENTION

Figure 1:
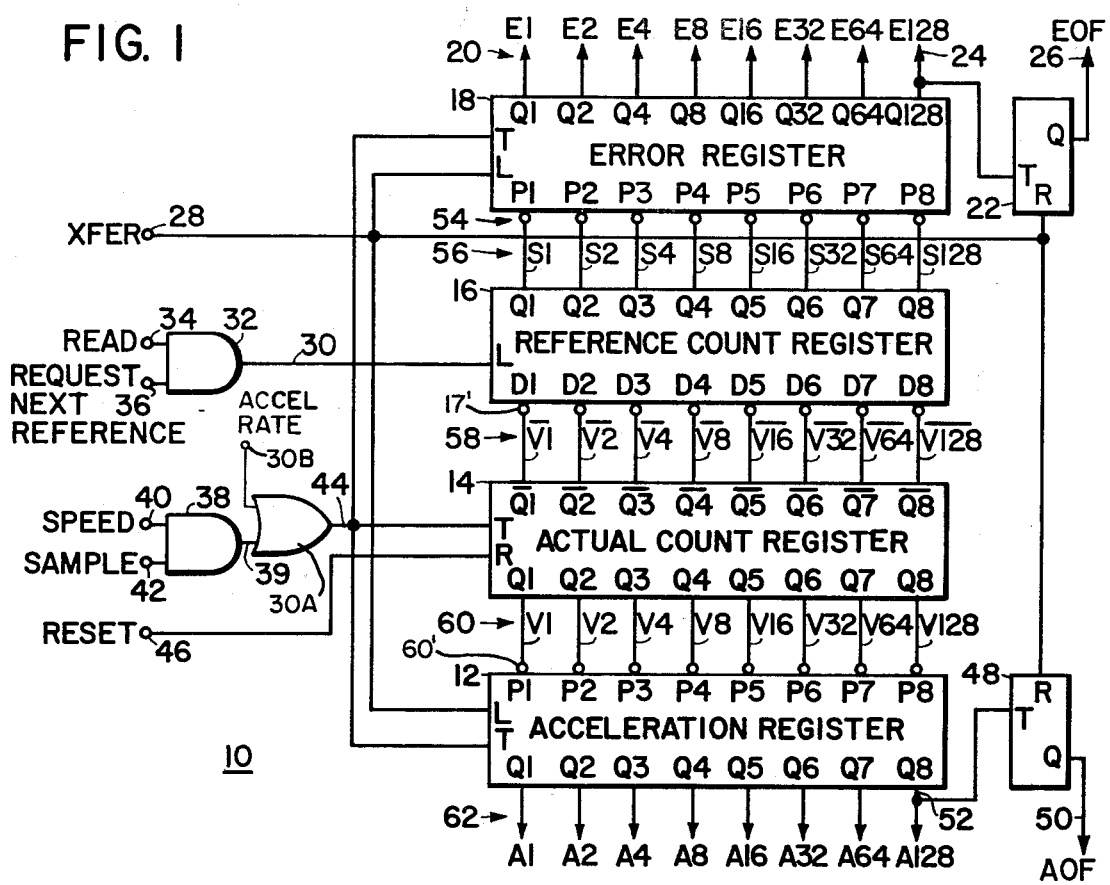
FIG. 1 is a diagram of the interconnection of the counters and registers of an embodiment of the invention.

Referring to FIG. 1, cruise control circuitry 10 includes Acceleration Register 12, which is a binary up-counter which increments in response to a pulse applied to the T (trigger) input, connected to conductor 44. Acceleration Register 12 includes 8 outputs Q1–Q8 each coupled, respectively, to 8 conductors 62, labeled A1, A2, A4, A8, A16, A32, A64, and A128. Acceleration Register 12 also includes preset inputs P1–P8, by means of which an initial number may be loaded into Acceleration Register 12. The circles such as 60' at the input P1–P8 of acceleration register 12 correspond to a logic level inversion. In response to a pulse at the L (load) input of acceleration register 12, the voltages on conductors V1, V2, V4, V8, V16, V32, V64, and V128 causes the complement of the binary number in the Actual Count Register 14 to be loaded in the corresponding bits of Acceleration Register 12. Each pulse on the T input results in one count up from the initially loaded binary number. Flip-flop 48, has a T (trigger) input connected to conductor 52, which is connected to A128, contains the overflow bit from Acceleration Register 12. The Q output of flip-flop 48 is connected to conductor 50, which generates the AOF (A overflow) signal. The reset input R of flip-flop 48 is connected to XFER (transfer) conductor 28. Flip-flop 48 may be considered a ninth bit of Acceleration Register 12. In essence, Acceleration Register 12 is a conventional presettable up-counter which may be implemented in many known ways.

Figure 2:
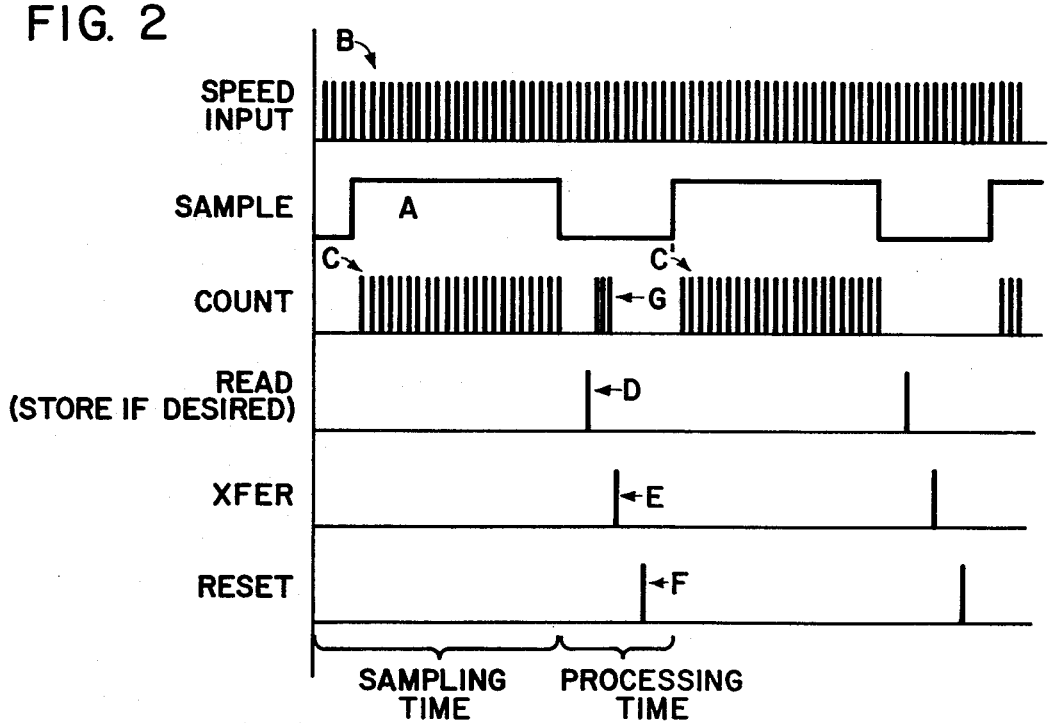
FIG. 2 is a timing diagram which depicts the inputs applied to the circuit of FIG. 1.

Actual Count Register 14 is a resettable eight bit up-counter. The Q outputs Q1–Q8 are shown connected to conductors 60, represented by V1, V2, V4, V8, V16, V32, V64, and V128. A pulse on RESET conductor 46 applied to the reset input R of Actual Count Register 14 causes all Q outputs to be reset to "0"s. The $\bar{Q}$ inputs $\overline{Q1}$–$\overline{Q8}$ are shown connected to conductors 58, represented by $\overline{V1}$, $\overline{V2}$, $\overline{V4}$, $\overline{V8}$, $\overline{V16}$, $\overline{V32}$, $\overline{V64}$, and $\overline{V128}$. The T input of Actual Count Register 14 is also connected to conductor 44. The count pulses which are applied to conductor 44 are shown in the third waveform in FIG. 2 and are generated by OR gate 30A which has its output connected to conductor 44 and one input connected to AND gate 38 by conductor 39 and the other input connected to node 30B, which has a signal called ACCEL (acceleration) applied thereto. AND gate 38 has SPEED input 40 connected to one input thereof and SAMPLE input 42 connected to the other input thereof. The SAMPLE waveform and the SPEED waveform are shown in FIG. 2. It should be noted that the OR-type gate 30A and the AND-type gate 38 could just as well be implemented with NAND and NOR gates, respectively. The main requirement of gate 38 is that it produce a counting pulse from its output corresponding to coincidence of the sample and speed inputs 42 and 40. The main requirement of gate 30A is that it produce a counting pulse on conductor 44 in response to either a pulse on the output of gate 38 or a pulse on input 30B.

It should be noted that the $\bar{Q}$ outputs of Actual Count Register could have been connected directly to the P inputs of Acceleration Register 12, thereby eliminating the need for the additional inversion represented by the circles 60'. For convenience, the connections have been shown as depicted in FIG. 1. For a more exact, practical implementation of the circuit of FIG. 1, see FIG. 3 and FIGS. 4a–4e.

Reference Count Register 16 is an 8 bit latch having inputs D1–D8, an L (latch) input, and outputs Q1–Q8. The circles such as 17' represent an inversion at the D inputs of Reference Count Register 16. The L input is connected to conductor 30 which is connected to the output of AND type gate 32, which produces pulses on conductor 30 when there is a coincidence of a READ pulse on input 34 and a Request Reference command on input 36.

Error Register 18 is a presettable 8 bit up-counter which may be substantially similar to Acceleration Register 12. The outputs Q1–Q8 are connected to conductors 20, on which the digits of the binary error word are E1, E2, E4, E8, E16, E32, E64, and E128. The T input is connected to conductor 44 and the L input is connected to XFER conductor 28. The small circles such as 54 represent inversion at the inputs P1–P8. Overflow flip-flop 22 has its T input connected to E128 and its R input connected to XFER conductor 28. The Q output of flip-flop 22 is connected to EOF (E overflow) conductor 26.

FIG. 2 shows the relevant timing diagram useful in explaining the operation of the embodiment of FIG. 1. The speed input (or velocity input) is the sequence of pulses B, with time being on the horizontal axis. In an automotive cruise control system, the pulses B could be generated by a magnetic pickup associated with a flywheel associated with the speedometer cable. The SAMPLE waveform includes a couple of wide pulses A. The circuit of FIG. 1 of AND gate 38 and OR gate 30A samples the speed input waveform during the sample pulses to produce the COUNT waveform C on conductor 44. The three pulses G appear on conductor 44 in response to three corresponding pulses applied to acceleration rate input 30B. (It should be recognized that speed, or linear velocity, or angular velocity inputs from systems other than automotive units could be utilized.)

During the READ operation pulse D is applied to conductor 34. If it is desired to store the contents of the Actual Count Register 14, a positive pulse is applied to REQUEST REFERENCE input 36, which produces a signal on the L input of Reference Count Register 16. The pulses G on conductor 44 are applied after the reference count is stored. The XFER pulse E is applied to conductor 28 and causes the complement of the contents of Reference Count Register 16 to be loaded into Error Register 18 and causes the complement of the contents of the Actual Count Register 14 to be loaded into the Acceleration Register 12. The Reset Pulse F is applied to conductor 46 and resets the contents of the Actual Count Register 12 to all "0"s. During the subsequent sampling time, Actual Count Register 14 is up-counted during pulses C′, and Error Register 18 and Acceleration Register 12 are up-counted by the same number of counts, measured from the previously loaded complemented binary numbers loaded therein during the XFER pulse E.

The pulses D, G, E, and F occur as non-overlapping pulses between sampling times in the respective order given.

Any overflow signals that result are loaded into flip-flops 22 and 48, respectively.

Figure 3:
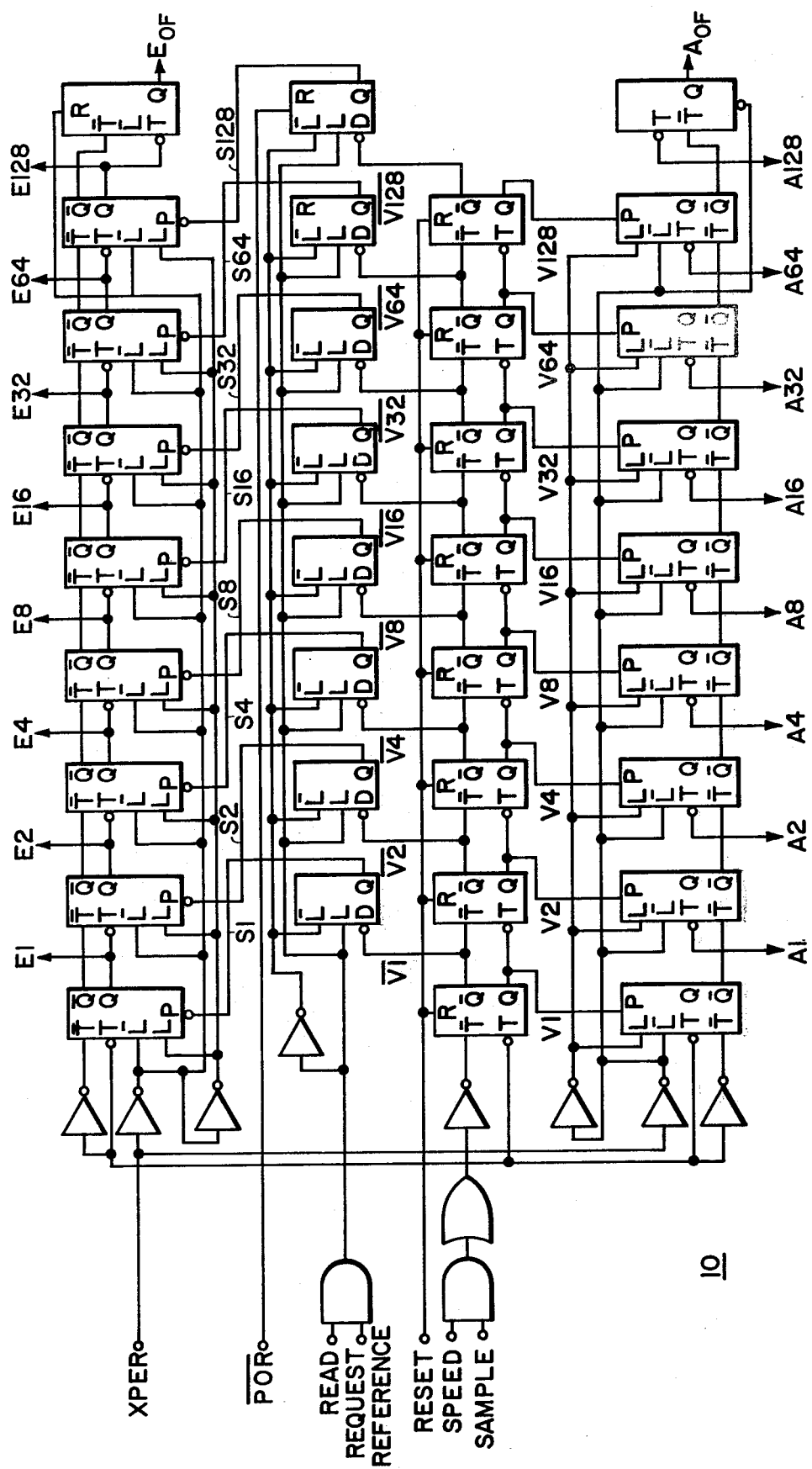
FIG. 3 is a more detailed diagram of the embodiment of FIG. 1.
Figure 4A:
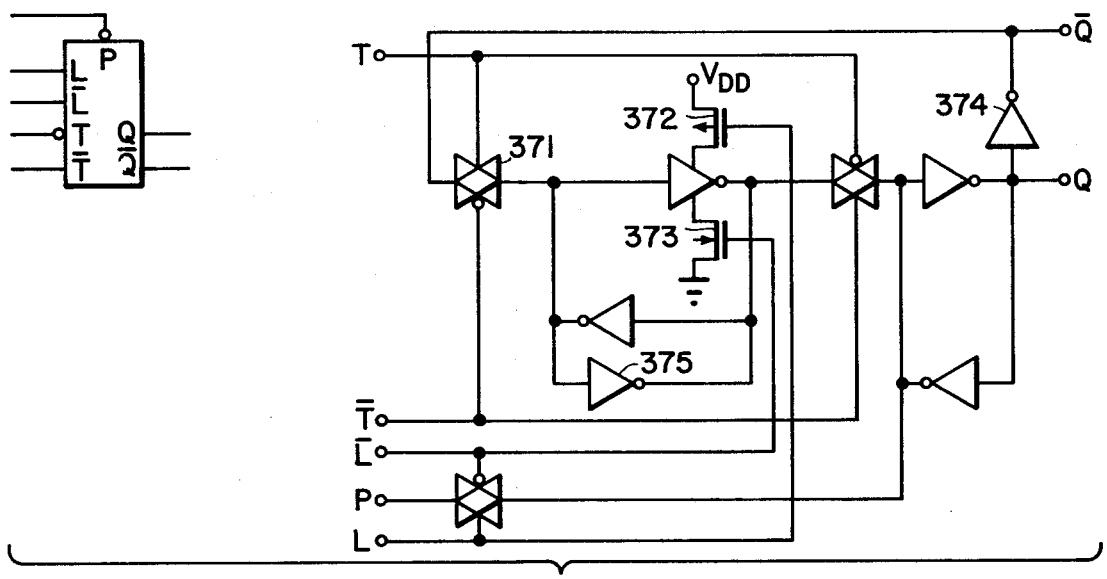
Figure 4B:
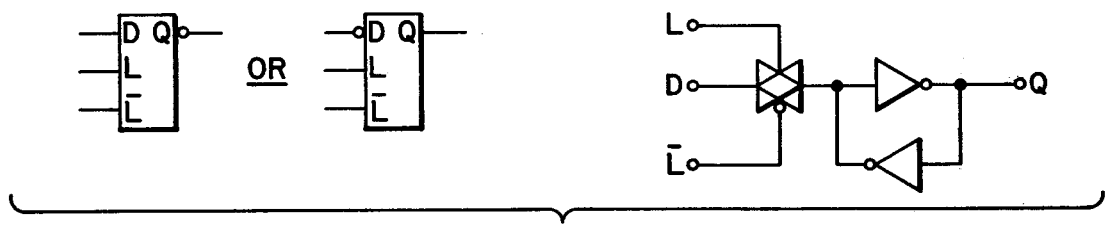
Figure 4C:
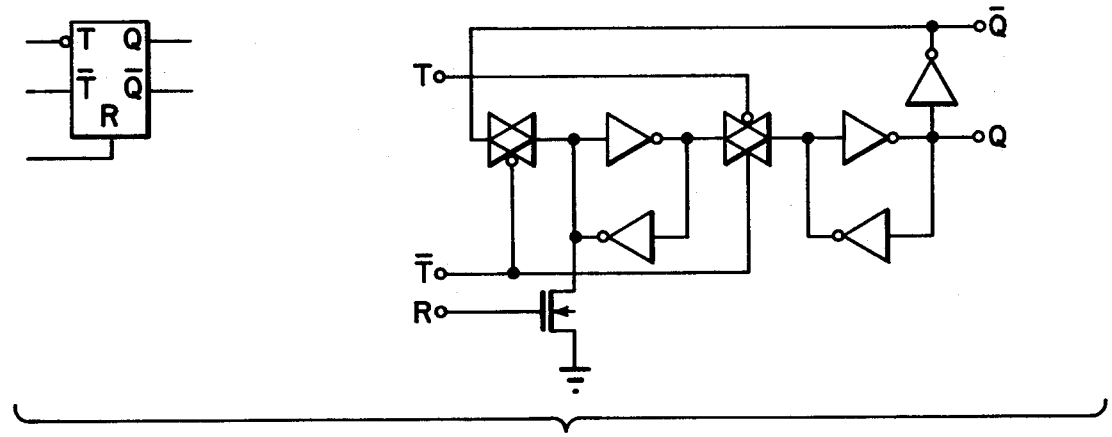

FIG. 3 is a more detailed diagram of the embodiment of the invention represented in block diagram form in FIG. 1. Further description of the detail in FIG. 3 would not be necessary to enable one skilled in the art to practice the invention. The various conductors in FIG. 3 are labeled the same as in FIG. 1. FIG. 4a–4e illustrate presently preferred circuit embodiments of the various flip-flops in FIG. 3. The symbols such as 371 represent CMOS (Complementary MOS) transmission gates each comprised of a P channel MOSFET (Metal Oxide Semiconductor Field Effect Transistor) and a N channel MOSFET coupled in parallel, with their respective gate electrodes coupled to complementary logic signals. The symbols such as 372 represent P channel MOSFETs, while the symbols represented by symbols such as 373 represent N channel MOSFETs. The inverters such as 374 and 375 in FIGS. 4a–4e represent CMOS inverters with inverters such as 375 having significantly weakened output drive capability as compared to inverters such as 374, which are also very well known to those skilled in the art. For more detail on MOS and CMOS circuits, see "Physics and Technology of Semiconductor Devices", by A. S. Grove, 1967 and also see "Manual for Integrated Circuit Users", by John D. Lenk, 1973, Reston Publishing Co. Va.

FIG. 5 illustrates the Error Register 18′ which could include Error Register 18 and Overflow flip-flop 22 of FIG. 1. Acceleration Register 12′ in FIG. 5 corresponds to Acceleration Register 12 plus Overflow flip-flop 48 in FIG. 1. Decode circuit 18A is connected to the outputs E1, E2, E4, E8, E16, E32, E64, E128, and EOF. Decode circuit 18A includes combination of logic gates which decode the several significant configurations of those signals. More specifically, decode circuit 18A detects the condition in which E1–E128 are all "1"s and EOF is a "0". Decode circuit 18A also detects when E1–E128 are not all "1"s and EOF is a logical "0", and also detects when a EOF is a logical "1". The significance of these three conditions will be explained hereinafter. Decode circuit 18B performs essentially the same type of decoding of A1–A128 and AOF.

The reason that the decoding circuits 18A and 18B perform the functions that they do, is that if a counter (for example, the Acceleration Register 12) is loaded with the inverted bit pattern of a first binary number, the result in that counter after further up-counting from that inverted bit pattern by a number of counts whose sum is equal to a second binary number will be as follows: (Rule I) — If the first binary number is equal to the second binary number, the overflow will be a logical "0", and the counter will contain all logical "1"s; (Rule II) — If the second binary number is greater than the first binary number, the overflow will be a logical "1", and the difference between the second binary number and the first binary number will be equal to the counter contents plus one; (Rule III) — If the first binary number is greater than the second binary number, the overflow will be a logical "0", and the difference between the first binary number and the second binary number will be equal to the complement of the counter contents.

One skilled in the art can easily test the correctness of the above statements themselves. Also see "Principles of Logic Design", by John N. Warfield, 1963, Ginn & Company, Boston, Massachussets.

The operation can best be described with reference to the diagram of FIG. 1, the timing diagram of FIG. 2, and the truth tables of Table I. In Table I, six truth tables are shown, one corresponding to each of time frames 1–6. The second column of Table I, headed STEP, lists, for each truth table, the operations depicted on the timing diagram. For example, SAMPLE means the counting that occurs during the sample waveform of FIG. 2. SAMPLE END refers to the contents of each of the counters at the end of the sample pulse A. Note that the truth tables show the register contents for each of the four registers in FIG. 1 during each of six time frames. The registers are identified by the labels associated with their outputs. For example the Error Register 18 is indicated in Table I by its outputs E1–

E128 and EOF. Similarly, the Actual Count Register 14 is indicated by V1–V128, the Reference Count Register 16 is indicated by S1–S128, and the Acceleration Register 12 is indicated by A1–A128 and AOF. The letter X is utilized in Table I to indicate a "don't care" situation, in which the counters are in the process of counting, and the intermediate results then are meaningless. The symbol $\phi$ also indicates a "don't care" situation in which the contents of the registers are meaningless during the first or second operations of the initial time frame.

TABLE I

| STEP | EOF | E128 | E69 | E32 | E16 | E8 | E4 | E2 | E1 | S128 | S64 | S32 | S16 | S8 | S4 | S2 | S1 | V128 | V64 | V32 | V16 | V8 | V4 | V2 | V1 | AOF | A128 | A64 | A32 | A16 | A8 | A4 | A2 | A1 |
|---|---|---|---|---|---|---|---|---|---|---|---|---|---|---|---|---|---|---|---|---|---|---|---|---|---|---|---|---|---|---|---|---|---|---|
| SAMPLE | X | | | | | | | | | | | | | | | | | X | | | | | | | | X | | | | | | | | |
| SAMPLE END | ɸ | ɸ | | | | | | | | ɸ | | | | | | | | ɸ | | | | | | | | ɸ | | | | | | | | |
| READ (Store) | ɸ | ɸ | ·o | o | o | — | — | o | — | ɸ | — | — | o | o | — | — | o | o | — | — | o | o | — | — | o | o | — | — | o | — | — | o | — | — |
| XFER | o | o | o | o | o | — | — | o | — | o | — | — | o | o | — | — | o | o | — | — | o | o | — | — | o | X | — | — | o | — | — | o | — | — |
| RESET | o | o | o | o | o | — | — | o | — | o | — | — | o | o | — | — | o | o | — | — | o | o | — | — | o | o | — | — | o | — | — | o | — | — |
| SAMPLE | X | o | o | o | o | — | — | o | — | o | — | — | o | o | — | — | o | X | — | — | o | o | — | — | o | X | — | — | o | — | — | o | — | — |
| SAMPLE END | o | o | o | o | o | — | — | o | — | o | — | — | o | o | — | — | o | o | — | — | o | o | — | — | o | ɸ | — | — | o | — | — | o | — | — |
| READ | o | o | o | o | o | — | — | o | — | o | — | — | SAME | | | | | o | — | — | o | o | — | — | o | o | o | — | — | o | o | — | — | o |
| XFER | X | — | — | — | — | — | — | — | — | — | | | SAME | | | | | X | — | — | o | o | — | — | o | X | o | — | — | o | o | — | — | o |
| RESET | o | o | o | o | o | — | — | o | — | o | | | SAME | | | | | o | — | — | o | o | — | — | o | o | o | — | — | o | o | — | — | o |
| SAMPLE | X | — | — | — | — | — | — | — | — | o | 1 | 1 | o | o | 1 | 1 | o | X | — | — | o | o | — | — | o | X | o | o | — | o | o | o | o | o |
| SAMPLE END | o | o | o | o | o | o | o | o | o | o | | | SAME | | | | | o | — | — | o | o | — | — | o | ɸ | o | o | — | o | o | o | o | o |
| READ | o | o | o | o | o | o | o | o | o | o | | | SAME | | | | | — | — | — | o | — | — | — | o | o | o | o | — | o | o | o | o | o |
| XFER | X | — | — | — | — | — | — | — | — | — | | | SAME | | | | | X | — | — | o | o | — | — | o | X | o | o | — | o | o | o | o | o |
| RESET | o | o | o | o | o | o | o | o | o | o | | | SAME | | | | | o | — | — | o | o | — | — | o | o | o | o | — | o | o | o | o | o |
| SAMPLE | X | — | — | — | — | — | — | — | — | o | 1 | 1 | o | o | 1 | 1 | o | X | — | — | o | o | — | — | o | X | o | o | — | — | — | — | — | — |
| SAMPLE END | o | o | o | o | o | — | — | o | — | o | | | SAME | | | | | o | — | — | o | o | — | — | o | ɸ | o | o | — | — | — | — | — | — |
| READ | o | o | o | o | o | — | — | o | — | o | | | SAME | | | | | — | — | — | o | — | — | — | o | o | o | o | — | — | — | — | — | — |
| XFER | X | — | — | — | — | — | — | — | — | — | | | SAME | | | | | X | — | — | o | o | — | — | o | X | o | o | — | — | — | — | — | — |
| RESET | o | o | o | o | o | — | — | o | — | o | | | SAME | | | | | o | — | — | o | o | — | — | o | o | o | o | — | — | — | — | — | — |
| SAMPLE | X | — | — | — | — | — | — | — | — | o | 1 | 1 | o | o | 1 | 1 | o | X | — | — | o | o | — | — | o | X | — | — | o | — | — | o | — | — |
| SAMPLE END | o | o | o | o | o | — | — | o | — | o | | | SAME | | | | | o | — | — | o | o | — | — | o | ɸ | — | — | o | — | — | o | — | — |
| READ | o | o | o | o | o | — | — | o | — | o | | | SAME | | | | | — | — | — | o | — | — | — | o | o | — | — | o | — | — | o | — | — |
| XFER | X | — | — | — | — | — | — | — | — | — | | | SAME | | | | | X | — | — | o | o | — | — | o | X | — | — | o | — | — | o | — | — |
| RESET | o | o | o | o | o | — | — | o | — | o | | | SAME | | | | | o | — | — | o | o | — | — | o | o | — | — | o | — | — | o | — | — |

During SAMPLE TIME, Acceleration Register 12, Actual Count Register 14, and Error Register 18 are all up-counting, one up-count for each COUNT pulse of FIG. 2. During the READ pulse, if it is desired to store the contents of Actual Count Register 14 in Reference Count Register 16, a pulse will be generated on conductor 30. In Table I, it is assumed that only during Time Frame 1 is a reference speed 01100110 loaded. The XFER operation, indicated by E in FIG. 2, results in the contents of the Reference Count Register 16 being complemented and entered into the Error Register 18, and simultaneously the complement of the Actual Count Register contents are loaded into the Acceleration Register. The RESET operation indicated by pulse F in FIG. 2 results only in the Actual Count Register 14 being reset to all "0"'s. The pulses G in FIG. 2 and the associated circuit operation will be described later, and are not depicted in Table I. Referring to time frame 1 of Table I, it is assumed that during sample pulse A, the Actual Count Register 14, referred to hereinafter as the "V counter", counts to the number 01100110, which corresponds to a decimal 102. The Error Register 18, hereinafter referred to as the "E register", and the Acceleration Register 12, hereinafter referred to as the "A register", also count during the sample time, but it does not matter what their contents are at the end of the sample time in Time Frame 1. The next thing that happens is that the binary equivalent of the decimal number 102 stored in the V register is stored in the Reference Count Register 16, hereinafter referred to as the "S register". It will be seen that for the rest of the example shown in Table I, the binary version of 102 remains stored in the S register, i.e., no new reference speed is entered. The next event is XFER (transfer), wherein the number 01100110 stored in the S register is inverted to 10011001 and stored in the E register; and the contents of the V register, which are 01100110, are inverted and stored in the A register, so that 10011001 is stored in the A register. Also during the XFER pulse the overflow bits of the E and A registers (EOF and AOF, respectively) are reset to "0"'s. The final event in Time Frame 1 is the occurrence of the RESET pulse, which resets the V register to all "0"'s. During the second time frame we assume that the speed of the automobile has not changed, consequently at SAMPLE END the V register still contains 01100110, corresponding to a decimal 102. During this counting, both the E register and the A register count up to all "1"'s, with no overflow. In accordance with Rule I, this means that the sample speed stored in the S register is equal to the new count and also that the new count is equal to the previous count, so that there is no acceleration. During the XFER operation of Time Frame 2, the contents of the S register, 01100110, are loaded into the E register and the contents of the V register, 01100110 are also inverted and loaded into the A register. During Time Frame 3 the speed is increased somewhat, so that by the SAMPLE END the V counter has counted from all "0"'s up to 01100111, which corresponds to a decimal 103. During this time the E counter has counted up by the same number of counts from 010011001 to all "0"'s with an overflow of 1, and the A counter has also counted up to all "0"'s with an overflow of 1. According to Rule II, since the overflow of both the E and the A registers is 1, the difference between the reference number and the new sample count is equal to the register contents plus 1. Therefore, the contents of the Error Register represent an increase of 1 over the reference speed, and the contents of the A register represent an increase of 1 over the previous sample speed. During Time Frame 4, at SAMPLE END the V register has counted up to a binary representation of a decimal number 103, which is the same as the previous speed. Therefore the acceleration is zero, and the Acceleration Register has an overflow of "0" plus all "1"'s. The Error Register indicates an error of 1 over the stored reference number 102. During Time Frame 5, the speed drops down to the binary equivalent of decimal 102, so that the Error Register indicates no error with respect to the stored reference number, i.e., overflow of "0" plus all "1"'s, while the Acceleration Register indicates "0" overflow and 11111110 which, according to Rule III, should be inverted to determine the deceleration, which is equal to "1". In Time Frame 6, the V counter counts up to 102, indicating no change in speed. The result here is exactly the same as in Time Frame 2.

Next, refer to the three pulses G of the count waveform of FIG. 2. These three pulses represent the amount of change (acceleration) desired between two consecutive samples of the contents of the Actual Count Register 14. After the Actual Count Register 14 has counted the pulses C to establish the present velocity, and after the READ pulse D but before the XFER pulse E, the three counts corresponding to pulses G occur. They result from three pulses applied to ACCEL input 30B of OR gate 30A causing the Acceleration Register 12, the Actual Count Register 14, and the Error Register 18 all to increase their contents by three. Next the XFER pulse loads the inverted reference number stored in Reference Count Register 16 back into the Error Register 18, so that the three extra counts are no longer reflected in Error Register 18. The new count total in the Actual Count Register 14 is inverted into Acceleration Register 12. The RESET pulse F resets the Actual Count Register 14 to "0"'s. Then during the next SAMPLE count, the Actual Count Register 14 counts the new sample speed, and the Acceleration Register 12 counts up from the complement of the earlier sample count plus the additional three acceleration pulses. Thus, the contents of Acceleration Register 12, which are decoded by the decode circuitry 18B (FIG. 5) shows a difference between the present sample speed and the previous sample speed which has been artificially increased by a count of three. This difference can be utilized to establish an acceleration rate equivalent to the number of G pulses per sample time. The difference found in the Acceleration Register 12 will be negative, zero, or positive if the contents of the Actual Count Register 14 is less than, matches, or exceeds, respectively, the change in count artificially by the G pulses. Also, the number of pulses G can be varied to increase or decrease the amount of acceleration under different operating conditions. Thus, for example, the desired acceleration can be varied from a number of pulses G when there is a large difference between the present speed and the stored reference speed to only one pulse when the actual speed is very close to the reference speed. Also, the Actual Count Register 14 could be implemented as an up-down counter to permit the number of pulses G to provide both acceleration and deceleration control over a wide range.

What is claimed is:

1. A digital system for use in a system for controlling vehicular speed and acceleration, said digital system comprising:

counting signal means for generating a first counting signal representative of a first velocity, a second counting signal representative of a predetermined acceleration, and a third counting signal representative of a second velocity;

first counting means responsive to said first, second, and third counting signals and coupled to said counting signal means for counting from an initial value to a first binary number representative of said first velocity in response to said first counting signal, counting from said first binary number to a second binary number in response to said second counting signal, and counting from an initial value to a third binary number representative of said second velocity in response to said third counting signal;

second counting means coupled to said counting signal means and to said first counting means for storing the logical complement of said second binary number and counting from said complement to a fourth binary number in response to said third counting signal;

first means coupled to said first counting means and said second counting means for generating said complement, and entering said complement into said second counting means;

decoding means coupled to said second counting means for decoding said fourth binary number to produce a binary number representing the algebraic difference between said second binary number and said third binary number.

2. The digital system as recited in claim 1 further comprising second means coupled to said first counting means for resetting said first counting means to said initial value.

3. The digital system as recited in claim 1 wherein said first counting means includes a first plurality of flip-flops connected as a resettable up-counter, and said second counting means includes a second plurality of flip-flops connected as a presettable up-counter, said second counting means further including overflow means coupled to the most significant bit of said second counter means for indicating a first overflow condition.

4. The digital system as recited in claim 1 wherein said first counting means includes:
a first conductor for conducting a first signal representative of said first velocity;
a second conductor for conducting a second signal representative of said predetermined acceleration;
an AND-type logic gate means having an output and also having one input coupled to said first conductor;
an OR-type logic gate having a first input coupled to said output of said AND-type logic gate means, and also having a second input coupled to said second conductor; and
said OR-type logic gate means having an output coupled to said first counting means.

5. A digital system for use in a system for controlling vehicular speed, said digital system comprising:
counting signal means for generating a first counting signal representative of a first velocity, a second counting signal representative of a predetermined acceleration, and a third counting signal representative of a second velocity;

first counting means responsive to said first, second, and third counting signals and coupled to said counting signal means for counting from an initial value to a first binary number representative of said first velocity in response to said first counting signal, counting from said first binary number to a second binary number in response to said second counting signal, generating the logical complement of said second binary number, and counting from said initial value to a third binary number representative of said velocity in response to said third counting signal; and second counting means coupled to said counting signal means and to said first counting means for storing said logical complement of said second binary number and counting from said complement to a fourth binary number in response to said third counting signal.

* * * * *